June 12, 1962  A. C. GEER  3,038,464

LAWN EDGE TRIMMING DEVICE

Filed Jan. 6, 1960

INVENTOR
A. C. Geer

BY

ATTORNEYS

United States Patent Office 3,038,464
Patented June 12, 1962

3,038,464
LAWN EDGE TRIMMING DEVICE
Austin Charles Geer, Old Rectory Cottage, Maidens Green, Winkfield, Windsor, England
Filed Jan. 6, 1960, Ser. No. 2,093
3 Claims. (Cl. 126—271.2)

The present invention relates to devices for trimming the grass edge or verge of lawns and has for an object to provide an improved such device.

Heretofore, it has been customary after cutting a lawn by means of a lawn-mower to trim the edges of the lawn with shears. In order to avoid unnecessary stooping long handled shears have been devised for such purpose but in spite of this, the trimming of the edge of a lawn by such means is a slow and laborious task and after trimming, the grass cuttings left by the shears require to be gathered up.

An object of the present invention is to provide a lawn edge trimmer having a means for supporting a flame producing device for movement along a grass edge or verge so that the flame of the said device is directed towards the edge to burn off blades of grass which extend outwardly therefrom.

Conveniently the flame producing device comprises a burner nozzle operated from bottled gas, there being provided a platform or carriage supported by a roller for carrying a bottle of gas. The burner is also supported adjacent one end of the roller by the platform or carriage which may conveniently be further supported by a trailing wheel or caster, a propelling handle member being connected to the platform for guiding the roller along the grass verge or edge.

In order to prevent the flame from burning or scorching plants positioned near the grass edge or verge, there may conveniently be provided a downwardly extending flame proof shield supported on the platform or carriage and spaced laterally outwardly therefrom so that the flame produced by the burner nozzle is confined between the said one end of the roller and the shield.

Figure 1:
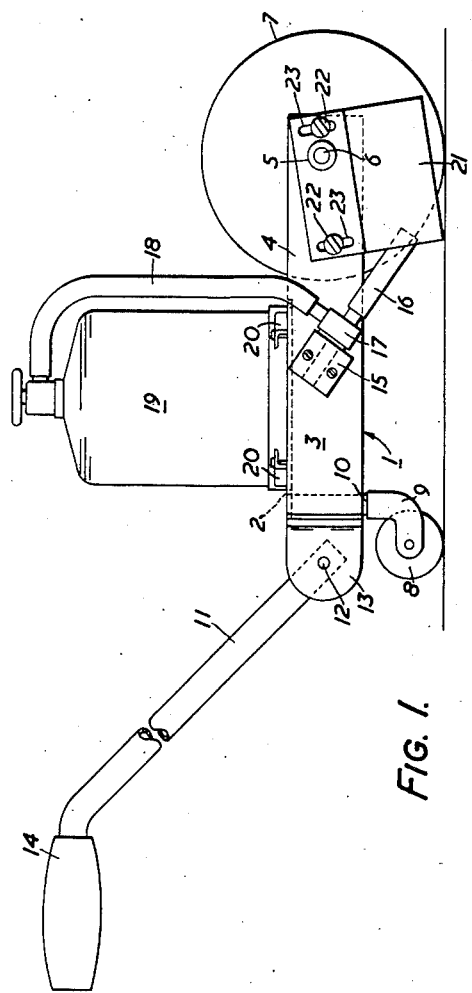
Figure 2:
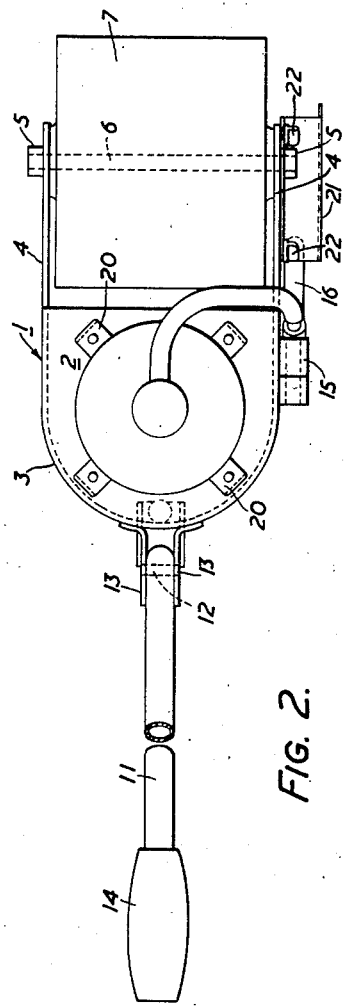

One embodiment of the invention will now be described with reference to the accompanying drawings, in which:

FIGURE 1 is an elevation of a grass edge trimmer according to the invention, and FIGURE 2 is a plan view thereof.

As shown in the drawings, the grass edge trimmer comprises a carriage indicated generally at 1 and formed by a platform 2 secured to a frame 3. The frame 3 extends forwardly as at 4 from either side of the platform and the forwardly extending portions 4 of the frame are provided at their front ends with bearings 5 which support a shaft 6 upon which is mounted a roller 7 which thus supports the front end of the platform for movement along the ground. The rear end of the platform is supported by a wheel 8 journalled in a bracket 9 secured to the lower end of a vertically extending spindle 10 rotatably supported by the frame 3, the wheel 8 thus forming a caster permitting the carriage to be guided by means of a propelling handle 11 extending rearwardly from the carriage and pivoted at its lower end on a pin 12 extending between a pair of rearwardly extending brackets 13 secured to the frame 3. A suitable hand grip 14 is provided at the upper end of the handle 11.

At one side of the carriage and secured to the frame 3 by means of a bracket 15, there is provided a gas burner 16 of known construction and which inclines downwardly and forwardly so that the flame produced by the burner is directed downwardly in the direction of movement of the carriage and adjacent one end of the roller 7. The burner 16 is provided with a connecting nipple 17 to which is connected one end of a flexible hose 18, the other end of which is connected to the outlet of a conventional gas bottle 19. The gas bottle is supported in an upright position on the platform 2 and suitable clamps 20 are provided for releasably securing the bottle on the platform.

A downwardly extending flame guard 21 in the form of a rectangular metal sheet is secured to the forwardly extending frame portion 4 at said one side of the carriage by means of screws 22 extending through slots 23 in an inwardly offset upper portion of the plate 21. By reason of the arrangement of fixing screws 22 and slots 23, the flame guard 21 is vertically adjustable and the aforementioned offset is such that the flame from the burner 16 is confined between the end of the roller and the flame guard 21.

In using the device described, the carriage is first positioned so that the end of the roller 7 adjacent the burner 16 lies substantially over the grass edge to be trimmed. The burner 16 is then ignited and the device is guided along the edge by means of the propelling handle 11, so that the overhanging grass is burned off by the flame issuing from the burner 16. The flame guard 21 prevents the burner from damaging plants which may be adjacent the grass edge and the roller 7 is made of sufficient mass to produce a cooling effect on the grass immediately adjacent the edge, thereby to prevent scorching of the grass due to the heat of the flame. In order to enhance the cooling effect of the roller 7, the roller may be made hollow so that it can be partially filled with water.

In a modification of the construction above-described, the burner supporting bracket 15 may be secured to the frame 3 so as to be angularly adjustable, thereby permitting the downward inclination of the flame to be adjusted.

The trimming device according to the invention possesses many advantages over the known devices in that it is easy to handle and requires no more effort on the part of the user than that of steering the roller along the grass edge or verge, the grass which is burnt falls on to the ground in the form of ash, thereby providing an excellent fertilizer and no sweeping or cleaning up operation is required. Furthermore, and because the blades of grass are severed by burning, the further growth of the grass is considerably delayed so that trimming of the grass edge is required to be carried out less frequently. In one series of tests it was found that when employing the conventional edge trimming devices, the edge required to be trimmed at least every two weeks, whereas with the trimming device according to the invention, the period between successive trimmings could be extended to from three to four weeks.

I claim:

1. Apparatus for trimming the edge of a lawn by burning the grass extending from said edge, said apparatus comprising an elongated roller having substantial mass, a propelling handle connected with said roller for propelling the roller over the lawn, means supporting a burner nozzle immediately adjacent one end of the roller, the said nozzle being inclined downwardly in the direction of movement of the roller and lying in a substantially vertical plane just beyond said end of said roller, and means for supplying fuel to said burner nozzle whereby the flame issuing from the nozzle burns the grass positioned just beyond said end of said roller, the mass of the roller being sufficiently large that it constitutes a relatively cool shield between the burner nozzle and the grass beneath said roller, and thereby prevents scorching of said last mentioned grass.

2. Apparatus as claimed in claim 1 in which said roller is hollow and adapted to be filled with water.

3. Apparatus as claimed in claim 1 and further including a downwardly extending flame guard supported in spaced relation with said one end of the roller and laterally outwardly spaced from the burner nozzle thereby to confine the flame between said one end of the roller and the flame guard.

References Cited in the file of this patent
UNITED STATES PATENTS

| | | |
|---|---|---|
| 1,196,182 | Tweit | Aug. 29, 1916 |
| 2,706,978 | Larson | Apr. 26, 1955 |